United States Patent
Hinton, Sr. et al.

(10) Patent No.: US 6,980,657 B1
(45) Date of Patent: Dec. 27, 2005

(54) COMMUNICATIONS SYSTEM USING CHAOTIC SYNCHRONIZED CIRCUITS

(75) Inventors: Daniel E. Hinton, Sr., Arnold, MD (US); Aaron B. Budgor, Potomac, MD (US); Nelson R. Dew, Ghent, WV (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/532,025

(22) Filed: Mar. 21, 2000

Related U.S. Application Data

(63) Continuation of application No. 09/116,661, filed on Jul. 17, 1998, now abandoned.

(51) Int. Cl.[7] .............................................. H04L 9/00
(52) U.S. Cl. .................... 380/263; 380/31; 380/34; 380/44; 702/75; 375/285
(58) Field of Search ............... 380/263, 257, 380/31, 34, 44; 702/75; 375/285

(56) References Cited

U.S. PATENT DOCUMENTS

| | | | |
|---|---|---|---|
| 5,048,086 A | 9/1991 | Bianco et al. ................ 380/28 |
| 5,245,660 A | 9/1993 | Pecora et al. ................ 380/48 |
| 5,291,555 A | 3/1994 | Cuomo et al. ................ 380/6 |
| 5,379,346 A | 1/1995 | Pecora et al. ................ 380/48 |
| 5,402,334 A | 3/1995 | Pecora et al. | |
| 5,432,697 A | 7/1995 | Hayes | |
| 5,473,694 A | 12/1995 | Carroll et al. ................ 380/48 |
| 5,655,022 A | 8/1997 | Carroll ........................ 380/48 |
| 5,680,462 A | 10/1997 | Miller et al. .................. 380/48 |
| 5,857,165 A | 1/1999 | Corron et al. | |
| 6,064,701 A | 5/2000 | Tresser et al. ............... 375/285 |
| 6,331,974 B1 * | 12/2001 | Yang et al. ................... 370/342 |

OTHER PUBLICATIONS

Chua et al. Transmission of digital signals by chaotic synchronization (Department of Electrical and Computer Sciences, University of California): 1993, pp. 395-403.*

Perez, Yu, Kowalski, Albert, Littler, and Song: "Synchronization of Chaos In Coupled Tunnel Diode Relaxation Oscillators" Department of Physics, University of North Texas, pp. 327-332.

(Continued)

*Primary Examiner*—Kim Vu
*Assistant Examiner*—Beemnet W Dada
(74) *Attorney, Agent, or Firm*—Banner & Witcoff, Ltd.

(57) ABSTRACT

A chaotic communication system employs transmitting and receiving chaotic oscillating circuits. In an embodiment of the invention employing a Chua circuit as the basic chaotic circuit, the transmitter has a tank circuit portion and a Chua diode portion linked through a resistance. The capacitance of the tank circuit is varied by selectively switching in and out of the tank circuit an auxiliary capacitance isolated by an optoisolator. Switching of the optosiolator is controlled by an information signal to generate a perturbed oscillation in the transmitting circuit. A voltage is tapped from the Chua diode circuit and transmitted to carry the information from the information signal. A receiver in another embodiment applies the transmitted signal to both the tank circuit and Chua diode portions of the receiving circuit. The transmitted signal is applied through a resistor to the Chua diode portion as well as the tank circuit portion. By applying the received signal to the Chua diode portion as well as the tank circuit, synchronization of the transmitter with the receiver is accelerated substantially. In still another embodiment, the tank circuit components are varied to generate a vocabulary of chaotic signals that can be decoded by various receiver embodiments that are described.

8 Claims, 11 Drawing Sheets

OTHER PUBLICATIONS

Bau and Singer: "Controlling a Chaotic System" Department of Mechanical Engineering and Applied Mechanics, University of Pennsylvania, pp. 145-151.

Hayes (U.S. Army Research Laboratory), Grebogi and Ott (University of Maryland): "Communication with Chaos" Dec. 1992, pp. 385-388.

Eweda: "Comparison of RLS, LMS and Sign Algorithms for Tracking Randomly Time-Varying Channels" Senior Member, IEEE Transactions on Signal Processing, vol. 42, No. 11, Nov. 1994, pp. 2937-2944.

Haykin and Li: "Detection of Signals in Chaos" Proceedings Of The IEEE, vol. 83, No. 1, Jan. 1995, pp. 95-122.

Delgado-Restituto, Lopez de Ahumeda and Rodriquez-Vazquez: "Secure Communications through Switched-Current Chaotic Circuits" Department of Analog Design, Spain, IEEE, Feb. 1995, pp. 2237-2240.

Carroll: "Communication With Use of Filtered, Synchronized, Chaotic Signals" US Government Work, IEEE Transactions On Circuits and Systems, Fundamental Theory and Applications, vol. 42, No. 3, Mar. 1995, pp. 105-110.

Kocarev (Faculty of Electrical Engineering, Cyril and Methodius University) and Roska (Computer and Automation Institute of the Hungarian Academy of Sciences): "Dynamics Of The Lorenz Equation And Chua's Equation: A Tutorial" Chua's Circuit, A Paradigm For Chaos (1993), pp. 25-55.

Madan (Office of Naval Research) and Wu (Electronics Research Laboratory and Department of Electrical Engineering and Computer Sciences, University of California): "Introduction To Experimental Chaos Using Chua's Circuit" Chua's Circuit, A Paradigm For Chaos (1993), pp. 59-89.

Kocarev, Halle, Eckert, Chua (Department of Electrical Engineering and Computer Science, University of California) and Parlitz (Germany): "Experimental Demonstration Of Secure Communications Via Chaotic Synchronization" Chua's Circuit, A Paradigm For Chaos (1993), pp. 371-378.

Halle, Wu, Itoh (Nagasaki University, Japan) and Chua (Electronics Research Laboratory and Department of Electrical Engineering and Computer Sciences, University of California): "Spread Spectrum Communication Through Modulation Of Chaos In Chua's Circuit" Chua's Circuit, A Paradigm For Chaos (1993), pp. 379-394.

Parlitz (Germany), Chua, Kocarev, Halle and Shang (Department of Electrical and Computer Sciences, University of California): "Transmission of Digital Signals By Chaotic Synchronization" Chua's Circuit, A Paradigm For Chaos (1993), 395-403.

Rodet Ircam and Center for New Music and Audio Technologies, University of California, Music Department: "Sound and Music From Chua's Circuit" Chua's Circuit, A Paradigm For Chaos (1993), pp. 434-446.

Johnson, Tigner and Hunt (Department of Physics and Astronomy, Condensed Matter and Surface Science Program, Ohio University): "Controlling Chaos In Chua's Circuit" Chua's Circuit, A Paradigm For Chaos (1993), pp. 449-457.

Kennedy (Department of Electronic and Electrical Engineering, University College Dublin), WU (Electronics Research Laboratory, University of California), PAU (Department of Electrical Engineering, Stanford University) and TOW (AT&T Bell Laboratories): "Digital Signal Processor-Based Investigation of Chua's Circuit Family" Chua's Circuit, A Paradigm For Chaos (1993), pp. 769-792.

Nasser, Hosny and Sobhy (University of Kent Canterbury, Electronics Laboratories): Maximum Dynamic Range of Bifurcations of Chua's Circuit Chua's Circuit, A Paradigm For Chaos (1993), pp. 821-831.

Leung (Surface Radar Section, Defence Research Establishment Ottawa, Canada) and LAM (Department of Physics, University of Ottawa, Canada) "Receiver Design of Chaotic Modulation System Using Adaptive Filters" SPIE, vol. 2612, pp. 126-135.

Table of Contents from book (1993) entitled "Chua's Circuit: A Paradigm for Chaos."

Cuomo and Oppenheim: "Chaotic Signals And Systems For Communications" 1993 IEEE International Conference on Acoustics, Speech, and Signal Processing, Apr. 27-30, 1993, pp. 137-140.

Yang and Chua: "Secure Communication via Chaotic Parameter Modulation" IEEE Transactions On Circuits and Systems I: Fundamental Theory and Applications, vol. 43, No. 9, Sep. 1996, pp. 817-819.

Parlitz and Kocarev: "Multichannel Communication Using Antosynchronization" International Journal of Bifurcation and Chaos In Applied Sciences and Engineering, vol. 6, No. 3, Mar. 1996, pp. 581-588.

Carroll and Pecora: "Using Multiple Attractor Chaotic Systems For Communication" Chaos, vol. 9, No. 2, Jun. 1999, pp. 445-451.

* cited by examiner

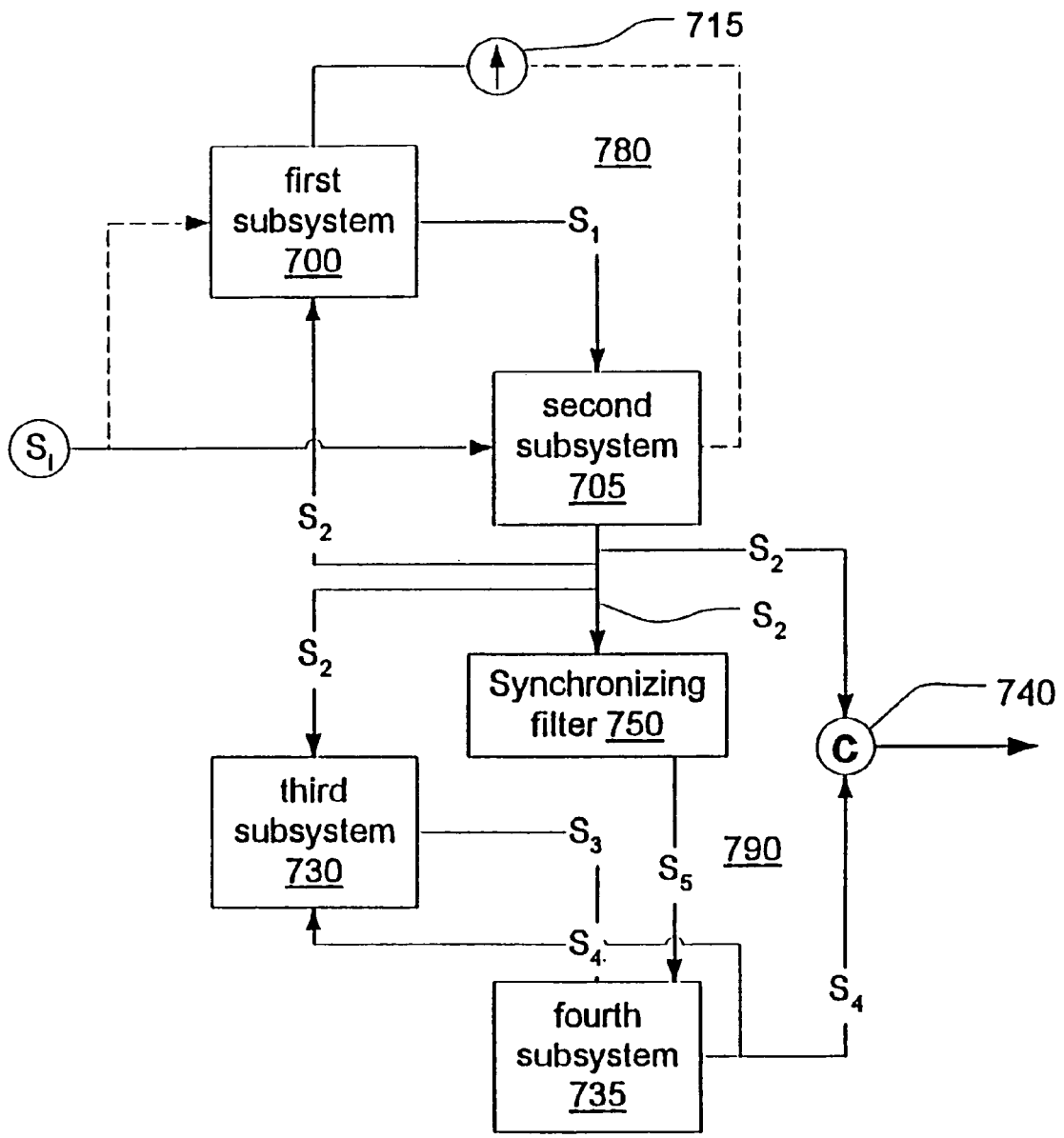

COMMUNICATIONS SYSTEM USING CHAOTIC SYNCHRONIZED CIRCUITS

This application is a continuation of common-owned, U.S. application Ser. No. 09/116,661 ("Communications System Using Chaotic Synchronized Circuits") filed on Jul. 17, 1998 now abandoned, naming Daniel E. Hinton, Sr., Aaron B. Budgor, and Nelson R. Dew as inventors, the entire disclosure of which is hereby incorporated by reference.

BACKGROUND

Referring to FIG. 1A, a circuit, known as the Chua circuit 1, oscillates chaotically. The term "chaos" applies to dynamic systems that follow simple dynamical rules, but whose state function trajectory is so sensitive to the system's initial conditions that its state after an arbitrary time-period cannot, in practical terms, be predicted. That is, its state could be predicted if it were possible to model the system with an arbitrary degree of precision. Chaotic systems evolve deterministically, and, their chaotic state paths are cyclic, but very complex and with extremely long cycle-lengths. In real systems, however, with extremely long cycle periods, it may be of little practical significance that their behavior is cyclical because the physical systems that generate the behavior may not be sufficiently stable for the system to ever return to the same dynamical system in its same initial state. For example, the component values of an electrical circuit may not remain precisely constant for 600 years.

The Chua circuit, a simple electrical circuit that exhibits chaotic behavior. It has been studied extensively and used to demonstrate many of the chaotic patterns observed in many physical systems. Referring now also to FIG. 1C, the basic Chua circuit includes a non-linear resistance element 10, characterized by a non-linear voltage-current characteristic curve. In a typical configuration, the curve is piece-wise linear with symmetrical slope discontinuities around the zero-axis. That is: $I_R = G_a V_R + (\frac{1}{2})(G_a - G_b)\{|v_R + B_p| - |v_R - B_p|\}$ where $G_a$ and $G_b$ are the slopes of respective linear portions of the piecewise-linear current/voltage curve characterizing the non-linear resistor and $B_p$ is the absolute value of the two voltage points at which the discontinuities in the current/voltage curve lie as shown in FIG. 1C. The circuit has a circuit-driving subsystem 2, a L-C tank circuit, and a response subsystem 3, with a capacitance/non-linear resistor, interconnected through a resistor 25.

Referring to FIG. 1D, a given choice of values of the physical characteristics of the components of the Chua circuit each correspond to a unique operating regime, some values of which may coincide with a chaotic behavior of the Chua circuit. The operating regime may be mapped onto a coordinate system whose axes are the lump parameters, $\alpha = C_2/C_1$ and $\beta = R^2 C_2/L$. By choosing values of R, L, $C_1$ and $C_2$ so that $\alpha$ and $\beta$ lie in, for example, a double scroll region 60, a Chua circuit can be made that will oscillate chaotically or quasi-periodically. The points on the plot correspond to different operating behaviors and a given point does not exhaustively define a particular path of state trajectories. Some points may correspond to radically different behaviors depending on the initial conditions. Given a specified physical configuration and a specified initial state specified by $V_1$, $V_2$, and $I_L$, the voltages across $C_1$ and $C_2$ and the current through L, the evolution of the Chua circuit's state is deterministic, but chaotic. That is, any Chua circuit with the same physical parameters and initial conditions will follow the same course of states over time and this course will repeat itself over a very long interval (perhaps many years). However, to an observer, the value of, say, $V_1$ over a period of time shorter than this long interval, looks like noise. Also, initial states that differ only slightly can follow widely different state paths. In addition, its power spectral density function is spread over a wide range of frequencies, with a peak at the frequency of the fundamental of the L-C tank circuit formed by L and $C_2$. However, compared to oscillators, such as used to generate carriers for radio transmission, the peak is not pronounced, that is, it is very short and wide.

The Chua circuit, aside from being a classic device for demonstrating, studying, and modeling chaotic real-world systems, has also been proposed as a basis for chaotic signal transmission. Generally a transmitting nonlinear dynamic circuit produces a chaotic signal that may be used to induce a receiving chaotic system to synchronize with it. The parameter of the transmitting chaotic circuit may be modulated or perturbed responsively to an information signal. The parameter may be a scalar, such as a voltage, tapped from the transmitting circuit and used as a signal. The signal is applied to the receiving system, causing the receiving system to synchronize with the transmitted signal. The chaotic signal from the synchronized receiving circuit may be used with the modulated transmitted signal to recover the information signal according to various prior art schemes. The chaotic signals derivable from an oscillating Chua circuit are similar to spread-spectrum signals including a range of frequencies. Chua circuits have been made to generate communications signals in frequency bands ranging from audio to radio frequency and in various media.

Various modulation schemes have been proposed. For example, a simple signal summing system adds the information signal to the chaotic scalar. A more complex correlation system uses a signal divider and multiplier at the transmitter and receiver, respectively. In FIG. 1B, a proposed transmitter and receiver design uses a Chua circuit to transmit signals and receive signals. The system has a transmitting Chua circuit 100 and an identical (in terms of its chaotic oscillating properties) receiving Chua circuit 101. The transmitting Chua circuit 100 oscillates in a chaotic or semiperiodic regime. Generally, the two chaotic circuits 100 and 101 may be synchronized by driving a portion of the receiving chaotic oscillator 101 with a driving function tapped from the transmitting chaotic oscillator 100. In the Chua circuit, a L-C tank circuit 105 of the transmitting Chua circuit 100 is linked through a resistor 81 to the capacitor/non-linear resistor portion 106. The latter portion causes the oscillations of the L-C tank circuit to become chaotic for certain values of the inductor 74, capacitors 71 and 73, and resistor 81 as discussed above with reference to FIG. 1D. The chaotic portion 108 of the identical receiving circuit 101, also a capacitor/non-linear resistor circuit, reproduces the driving signal. That is, the transmitting 100 and receiving 101 circuits follow precisely the same chaotic course of states (assuming no modulation is taking place in the transmitting circuit 100).

It is known that the transmitting 100 and receiving 101 circuits will remain synchronized even when a substantial amount of noise and/or information is injected into the driving signal. Thus, in the prior art embodiment of FIG. 1B, a signal current $I_i(t)$ is injected by a driver 76 that converts a signal voltage through an invertable coding function $c(v_s(t))$. The decoded signal at the receiver is then obtained from the received current signal $I_d(t)$ by applying the inverse coding operation to the received current signal $I_d(t)$ to obtain a voltage signal containing the information signal.

Note that the term, "synchronous," in this context, characterizes the convergence of two state variables toward identical or linearly related, but continuously changing, sets of values. That is, a change in one variable corresponds to a change in a synchronized variable that is linearly related to the change in the one variable. Thus, plotting one variable against the synchronized variable over time, the result, theoretically, is a straight line. Synchronization of non-linear systems, and the mathematical modeling of such systems, is described in some detail in U.S. Pat. Nos. 5,245,660, 5,473, 694, 5,402,334, 5,379,346 5,655,022, 5,432,697, and 5,291, 555, the entirety of each of which is incorporated by reference herein.

Prior art systems have been discussed widely, but few practical working designs are known. The problems with practical synchronization systems are summarized in the introduction of U.S. Pat. No. 5,680,462. Synchronization systems are inherently noisy and error prone due, at least in part, to the time it takes for synchronization to occur in a noisy channel. For example, when a transmitting circuit is perturbed to encode a piece of information (a bit), it takes a finite amount of time for the receiving circuit to begin to follow the trajectory of the transmitted signal. Also, according to the prior art, modulation also cannot span too great a range. Otherwise, a tightly locked synchronization, which is, according to the prior art, essential, cannot be maintained. In addition, the practical problems attending achievement of high data throughput, the providing of reliable locking performance, and various purely practical design considerations have not received a great deal of attention. These prior art problems are addressed by the present invention.

OBJECTS AND SUMMARY OF THE INVENTION

It is an object of the invention to provide a spread-spectrum-like communications system that transmits information in a chaotic signal.

It is another object of the invention to provide a method for modulating a chaotic process to generate a signal to encode information in the signal.

It is still another object of the invention to provide a method for modulating a circuit that generates a chaotic signal in a stable manner.

It is still another object of the invention to provide transmitting and receiving chaotic circuits that are characterized by rapid synchronization.

It is still another object of the invention to provide a mechanism for imprinting and extracting information from two chaotic devices synchronized by a chaotic signal in which the information is embedded such that the chaotic signal can serve as the information carrier signal over a communication channel.

It is still another object of the invention to provide a communications system that permits the modulation of a chaotic process so as to encode multiple independent streams of data on a same chaotic carrier signal, in effect, implementing an N-word vocabulary, where N corresponds to a number of stable chaotic oscillation states that are induced in a transmitter by modification of a property of at least one of a resistance, a capacitance, and an inductance to tune an oscillating circuit of the transmitter.

Briefly, an embodiment of the invention employs a transmitting oscillating circuit capable of chaotic or quasiperiodic oscillation to generate a (chaotic or quasiperiodic) carrier, preferably a voltage tapped through a voltage follower. A property of the transmitting oscillating circuit, in an embodiment, an auxiliary capacitance, is switched on and off to vary the capacitance of a L-C tank portion of a Chua oscillator. The switching is controlled by an information signal to generate a modulated chaotic signal. Switching is performed with an optical isolator that requires zero output biasing and introduces essentially no capacitance into the circuit. This prevents any effect on the chaotic or quasi-periodic operating regime of the circuit. An autonomous portion of a receiving oscillating circuit, substantially identical in terms of its oscillating properties, is driven by the modulated carrier. This establishes a synchronized chaotic or quasiperiodic oscillation in the receiving circuit. A comparator is used to output the difference between the driving modulated carrier and a synchronized signal tapped from the receiving oscillator at a point corresponding to the transmitting circuit tap used to generate the modulated carrier. This output provides the recovered information signal. In an embodiment, various elements of the transmitting chaotic circuit are switchably varied to maintain a constant operating regime so that strange attractors, with frequencies covering a wide selectable range, are generated. This is used to form a vocabulary of strange attractors. The frequency can be determined by the receiver in a very simple way by counting pulses formed from a difference between the base signal in the receiving circuit and the received signal. The difference in the frequencies of the signal being transmitted and the base signal generated by the receiver indicates the "word" transmitted. In this way, if the vocabulary consists of N distinguishable oscillating frequencies, then $\log_2(N)$ bits can be transmitted with each modulating cycle.

According to an embodiment, the invention is a communications device with a transmitting chaotic circuit. The transmitter has at least one circuit element, the value of which affects a chaotic electrical property of the chaotic circuit. That is, a change in the magnitude of the circuit element changes the oscillating behavior of the chaotic transmitting circuit. The circuit element has multiple component elements, at least one of which is isolated from the chaotic circuit by a switch. The configuration is such that when the switch is switched to a first state, the magnitude has a first value and when the switch is switched to a second state, the magnitude of the component has a second value. This causes the transmitter to oscillate over multiple oscillating regimes each corresponding to one of the values. The chaotic property may be applied to a communications channel to be picked up by a receiver. Switching the circuit element allows, essentially, a chaotic signal to be modulated. That is, a chaotic signal tapped from the transmitter (for example the voltage at the junction of R and C1), applied to a communications channel, and picked up by a receiver. The switch is controllable responsively to an information signal, whereby the chaotic carrier signal is modulated by the information signal. This information signal can be detected by applying the chaotic signal from the channel to a receiving chaotic circuit that synchronizes with the chaotic signal corresponding to one of the chaotic oscillating regimes of the transmitter, but not with another and detecting the alternations between synchronization and desynchronization.

According to another embodiment, the invention is a communications device with a transmitting chaotic circuit configurable responsively to an information signal. The configurations are such that the transmitting chaotic circuit produces at least three different chaotic signals, each characterized by a different trajectory-versus-time characteristic. The device includes a receiver with an oscillating subportion to which the different chaotic signals can be applied to drive the oscillating subportion. The receiver has a beat detector connected to the oscillating subportion to detect a difference between a fundamental frequency of the oscillating subportion and a current chaotic signal. This allows the information signal to be detected by the detection of beats.

According to still another embodiment, the invention is a communications receiver with a chaotic oscillator which has an oscillator portion and a chaotic portion. The chaotic portion has a non-linear resistance element that forms a chaotic oscillator with the oscillator portion when the chaotic portion and the oscillator portions are coupled to pass a current signal therebetween. The oscillator portion is signally coupled to a communications medium carrying a modulated chaotic signal. The chaotic portion is also signally coupled directly to the communications medium such that a voltage of the communications medium is directly applied to the chaotic portion through a circuit path parallel to a coupling allowing the current signal to pass between the oscillator portion and the chaotic portion. Thus, both the chaotic and oscillating portions of the receiver are driven by the incoming chaotic signal from the communications channel.

According to still another embodiment, the invention is a communications device with a chaotic oscillator connectable to a communications channel. The chaotic oscillator has a tank circuit with at least two capacitors and an inductor. The first of the capacitors is connected to an inductor and a second is selectively connectable to the inductor to combine respective capacitances of the capacitors through a switch. In other words, the capacitors combine their capacities responsively to the switch. The switch has an input for accepting an information signal. The information signal controls the switch so that the chaotic oscillator is selectively alternated between at least two oscillating regimes. The result is that a chaotic transmitter is modulated in accord with the information signal to generate a chaotic signal which, at each instant, oscillates according to a selected one of the oscillating regimes. A receiver signally coupled to the communications channel has a receiving chaotic oscillator portion for each of the oscillating regimes, each portion being configured to synchronize with a respective one of the at least two chaotic signals. By detecting which portion is in synchrony with the incoming signal, the information signal can be detected.

According to still another embodiment, the invention is a communications system with transmitting and receiving Chua circuits. At least one component of the transmitting Chua circuit includes at least two subcomponents, at least one of which is selectively isolated from the transmitting Chua circuit by a switch. This is done such that a current oscillating regime of the transmitting Chua circuit is selectively alternated between at least two respective oscillating regimes. The switch is switchable responsively to an information signal. The values of the subcomponents together with a configuration of the switch are such that one of the oscillating regimes is substantially the same as an oscillating regime of the receiving Chua circuit. The result of the latter is that the receiving Chua circuit is synchronizable with the transmitting Chua circuit when the current oscillating regime is the same oscillating regime as the receiver's. A detector is connected to detect when the receiving Chua circuit is in synchrony with a chaotic signal generated by the transmitting Chua circuit. This allows the information signal to be recovered from the chaotic signal.

According to still another embodiment, the invention is a communications receiver with a chaotic oscillator which has an oscillator portion and a chaotic portion. The chaotic portion has a non-linear resistance element that forms a chaotic oscillator with the oscillator portion when the chaotic portion and the oscillator portions are coupled to pass a current signal therebetween. The oscillator portion is signally coupled to a communications medium carrying a modulated chaotic signal. The chaotic portion is also signally coupled directly to the communications medium such that a voltage of the communications medium is directly applied to the chaotic portion through a circuit path parallel to a coupling allowing the current signal to pass between the oscillator portion and the chaotic portion. Thus, both the chaotic and oscillating portions of the receiver are driven by the incoming chaotic signal from the communications channel. In this embodiment, the coupling resistance is a series of three resistors that provide the coupling from the voltage of the communications medium to the chaotic portion of the circuit and provides a voltage divider network for a comparator detector for the detection of voltage differences between the voltage of the communications medium and the chaotic voltage generated by the receiver chaotic portion of the system.

According to still another embodiment, the invention is a communications receiver system as described in the previous paragraph except the receiver is divided into an oscillator portion and a chaotic portion which are separately driven through emitter followers from the voltage of the communications medium. This allows the voltage of the communications medium to drive the oscillator portion and the chaotic portion of the receiver without direct feedback between the two through the synchronizing resistor. This prevents spontaneous chaotic oscillation in the receiver due to a feedback path from the chaotic portion of the Chua circuit to the oscillator portion of the Chua circuit. The circuit still synchronizes since the voltage of the communications medium is coupled to both the oscillator portion of the receiver and the chaotic portion of the Chua circuit. As a result the receiver responds only when there is a voltage on the communications medium to stimulate the system. (see FIG. 4e).

According to still another embodiment, the invention is a communications receiver system divided into an oscillator portion and a chaotic portion. The oscillator portion is driven by the voltage of the communications medium. The voltage of the chaotic portion is fed back to the oscillator portion through an emitter follower and the synchronizing resistor in a phase lock loop type arrangement. This allows the voltage of the communications medium to drive the oscillator portion and the voltage of the chaotic portion of the receiver to directly feedback through the synchronizing resistor to quickly synchronize the communications system in the presence of a voltage on the communications channel. This arrangement rapidly synchronizes the communications system. The circuit still synchronizes since the voltage of the communications medium is coupled to the oscillator portion of the receiver and the chaotic portion of the Chua circuit feeds back a portion of the receiver voltage. As a result, the receiver responds only when there is a voltage on the communications medium to stimulate the system (see FIG. 4f).

BRIEF DESCRIPTION OF THE FIGURES

FIG. 2b is a receiver according to the invention which for use with the transmitter of FIG. 2a.

FIG. 3b is a receiver for use with the embodiments of FIG. 3a and FIG. 4a.

FIG. 5 is a schematic of a generalized communications system with a synchronizing filter according to an embodiment of the invention.

DETAILED DESCRIPTION

Figure 1A:
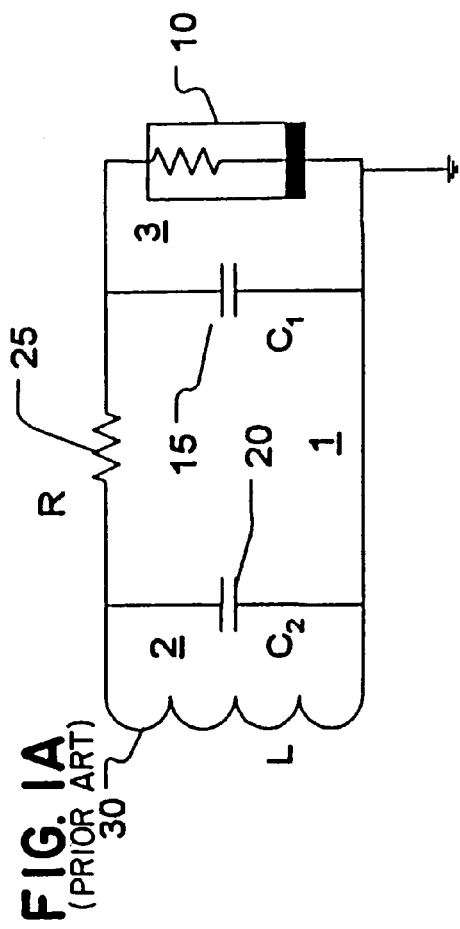
FIG. 1A is a diagram of a Chua circuit according to the prior art.
Figure 1B:
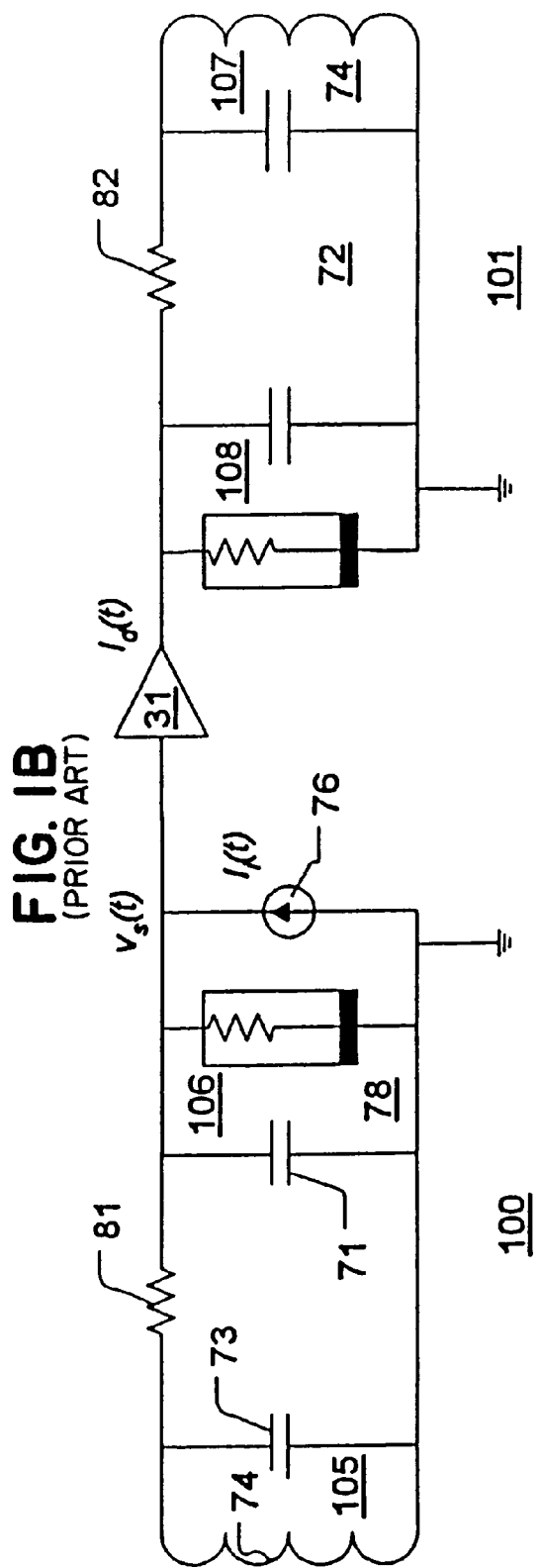
FIG. 1B is a communications system according to the prior art.
Figure 1C:
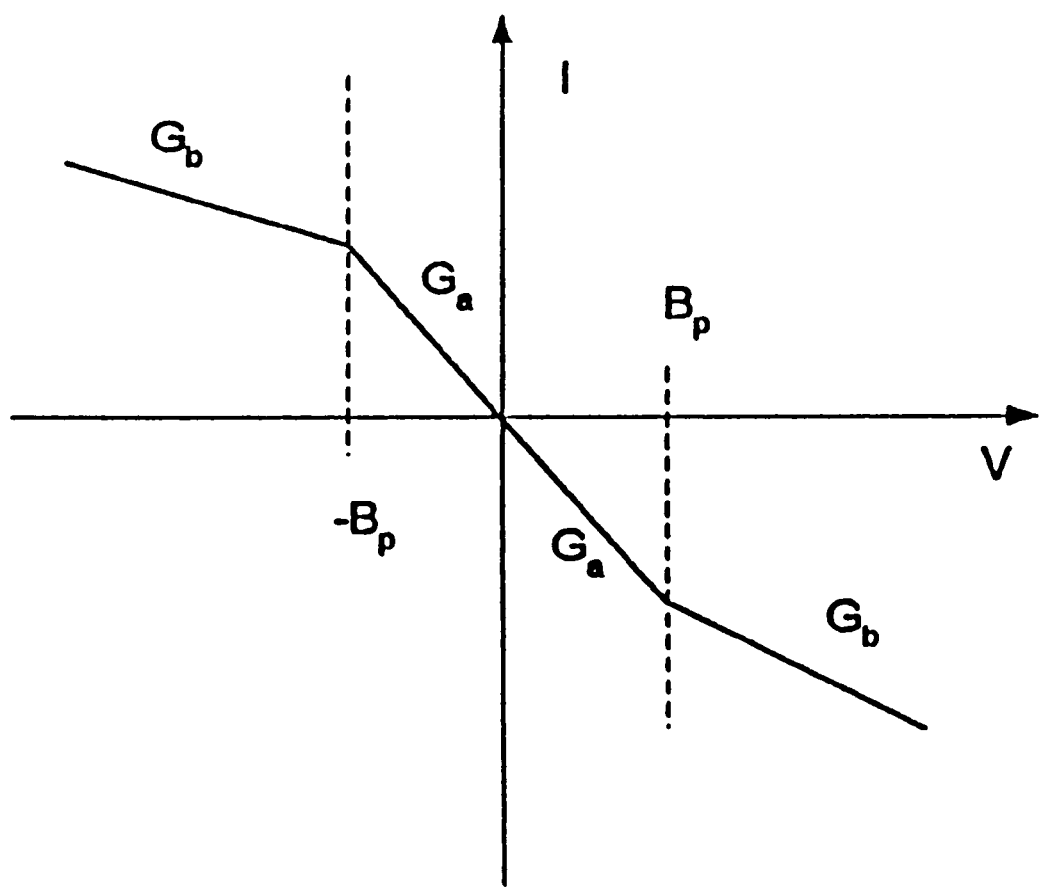
FIG. 1C is a diagram indicating the resistance-voltage characteristic of a non-linear resistor used in a Chua circuit.
Figure 1D:
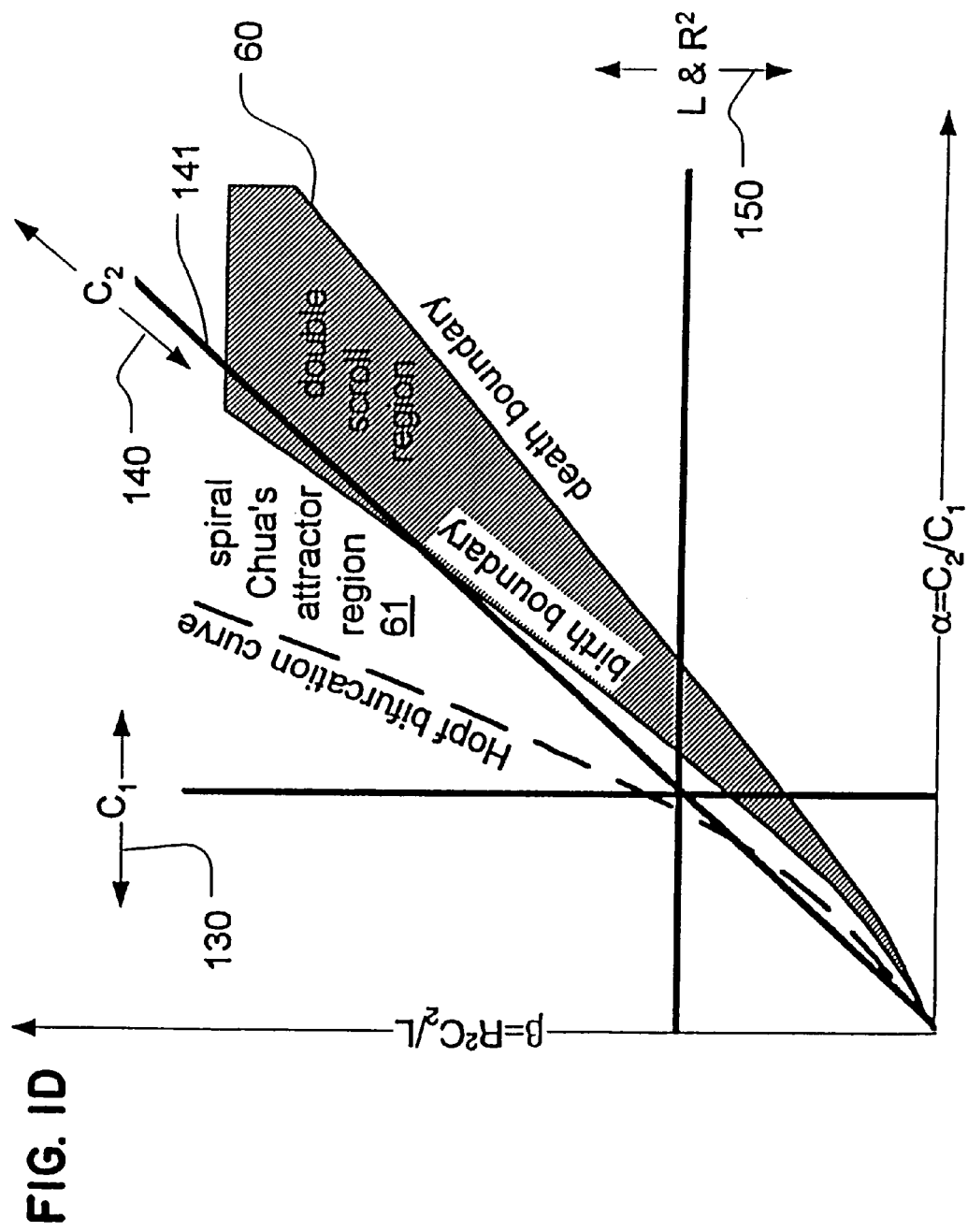
FIG. 1D is a diagram of the operating regimes of a Chua circuit mapped into a lump parameter plane.

Referring again to FIG. 1D, discussed in the background, the various chaotic oscillating regimes of the Chua circuit are mapped on an $\alpha/\beta$ parameter plane. Circuits falling in a double scroll region 60 are characterized by oscillation about two strange attractor equilibrium points. Circuits falling in a spiral set of oscillating regimes 61 exhibit oscillation about only one strange attractor equilibrium point. Varying $C_1$ causes the $\alpha/\beta$ combination to shift as indicated by arrow 130. Varying $C_2$ causes the $\alpha/\beta$ combination to shift as indicated by arrow 140. Varying $R_2$ or L causes the $\alpha/\beta$ combination to shift as indicated by arrow 150. As can be seen from the diagram (FIG. 1D, the capacitance $C_2$ of capacitor 20 may be varied over a wide range while still maintaining operation of the circuit in the double scroll oscillating regime 110. A much smaller range of values of capacitance of capacitor 15 ($C_1$) coincide with operation in the double scroll regime 60. The wide range of capacitances $C_2$ of capacitor 20 that coincide with operation in the double scroll region 60 is exploited in a first embodiment of the invention discussed immediately below.

Figure 2A:
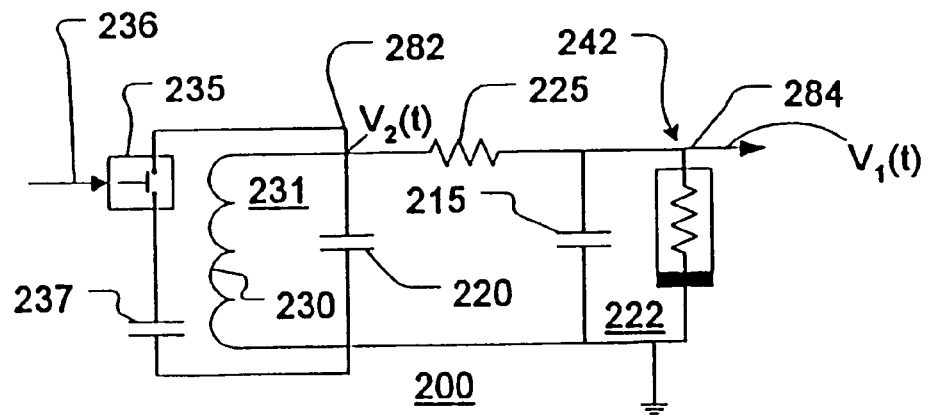
FIG. 2a is a schematic of a transmitter according to the invention in which a capacitor is switched to modulate an information signal.

Referring now also to FIG. 2a, in an embodiment of the invention, a transmitter 200 includes a modified-Chua circuit. The transmitter 200 generates a modulated chaotic signal responsively to an information signal 236. The transmitter 200 has a primary 220 and auxiliary 237 capacitor. The auxiliary capacitor 237 is selectively switched into the circuit to add selectively to the $C_2$ capacitance of the embedded Chua circuit. By switching the auxiliary capacitor 237 off and on, the transmitter oscillates according to a base oscillating regime and an alternate oscillating regime, respectively. By controlling optoisolator 235 responsively to an information signal 236, an alternating pattern of chaotic oscillations is generated which may be characterized as a modulation of the base chaotic oscillation. This modulated chaotic pattern can be transmitted to a receiver by transmitting a voltage $V_1$ tapped from point 284.

Figure 2B:
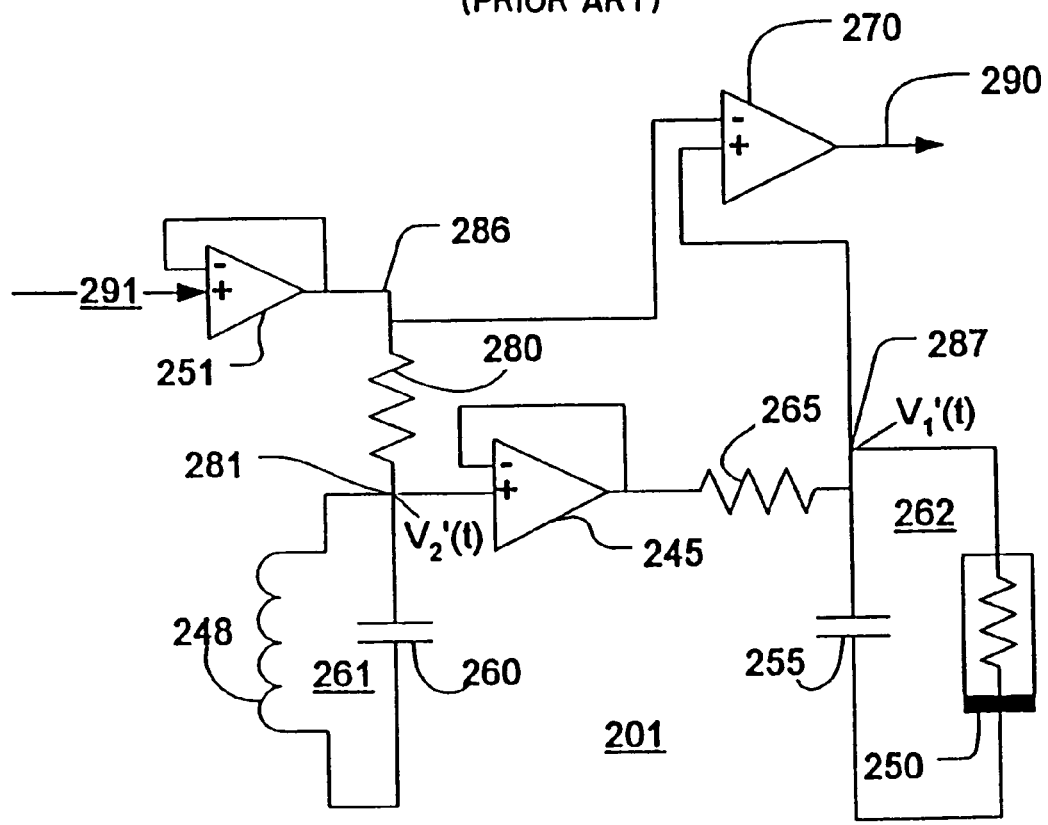

Referring now also to FIG. 2b, the modulated chaotic signal 236 is detected by a receiver 201 containing a modified-Chua circuit whose component properties are chosen to insure that the receiving circuit 201 will exhibit the same oscillating behavior as the base configuration (auxiliary capacitor 237 switched off) of the Chua circuit of the transmitter 200. The need to match oscillating behaviors is to allow the receiving circuit 201 to synchronize with the received signal 290. One way to match the oscillating behaviors of the transmitting and receiving circuits 200 and 201 is to match the values of the components that determine the oscillating behavior. The resulting transmitted voltage $V_1$, output from the transmitter 200, is applied as input signal 291 to the receiver 201. Note that the component values need not be matched perfectly. It has been found that the receiver's $\alpha$ and $\beta$ may differ by as much as approximately 5 percent from the transmitter's without substantially affecting the ability of the circuits to synchronize.

The use of an optoelectronic switch 235 avoids any need for output biasing. Also, an optoelectronic switch 235 also adds no significant capacitance to the circuit. A low output biasing and low capacitance of the switching element make it easier to match the component values of the receiving and transmitting circuits 201 and 200 to insure synchronization. Alternatively, a reed switch or a field effect transistor (FET) may be used to isolate the auxiliary capacitor 237 from the main circuit. To provide a lower output biasing requirement, multiple FETs may be employed as a single switch. In the embodiment of FIGS. 2a and 2b, the modulated chaotic signal is produced by varying the capacitance $C_2$ of the tank circuit 231 as described above. That is, in the transmitter 200, the auxiliary capacitor 237 is isolated from the main circuit by an optoelectronic switch 235.

To modulate the transmitter 200, the capacitance $C_2$ of the tank circuit 231 is modulated by intermittently combining the capacitance of the auxiliary capacitor 237 with the capacitance of capacitor 220. This capacitance corresponds to the capacitance of capacitor 20 in the unmodified Chua circuit 101, that is, to $C_2$. By intermittently altering this capacitance responsively to the input signal 236, the Chua circuit of the transmitter 200 alternates between two different oscillating patterns.

The voltage signal $V_1(t)$ can be transmitted by any means desired. For example, the output chaotic signal $V_1(t)$ can be used to modulate an optical carrier, laser carrier, radio carrier, applied directly to a metallic (wire) interface, applied to a speaker and transmitted as sound waves, or transmitted using any other mechanism. The received signal may also be applied through an automatic gain control circuit (not shown in this embodiment) for signal conditioning.

In the embodiment of FIG. 2b, the received signal may be applied through a voltage follower 251, if desired for high input impedance, through a resistor 280, and finally to a bridge point 286 of a L-C tank circuit 261. The tank circuit 261 has an inductor 248 and a capacitor 260 and may include a resistor in addition to its inherent resistance. The L-C tank circuit is connected to the chaotic portion of the embedded Chua oscillator of the receiver circuit 201 by a voltage follower 245. Current from the L-C tank circuit 261 is applied through the voltage follower 245 and a resistor 265 whose resistance whose magnitude matches that of the transmitting circuit resistor 225. In other words, the resistance R of the Chua circuits match. By matching the resistance of 280 to that of resistor 225, tank circuit 261 is driven or pumped by the incoming signal exactly as tank circuit 231 is pumped by the chaotic portion 222. When the $C_2$ values of the transmitter tank circuit 231 and the receiving tank circuit 261 are identical (that is, when auxiliary capacitor 237 is isolated from the tank circuit by optoisolator 235), a time-varying voltage at 281 synchronizes and subsequently tracks that of the incoming signal 291. This synchronization occurs because the incoming signal matches that at corresponding point 282 of the transmitting circuit, so the environments of tank circuit 261 and tank circuit 231 are the same. Also, the voltage at point 281 is applied through a resistor 265 that is also matched to resistor 225 so the environment of the chaotic part 262 of the receiving circuit 201 is also the same as the environment of the chaotic part 222 of the transmitting circuit 200. Thus, when the transmitter is oscillating about the base strange attractor equilibrium points (base referring to the situation when the auxiliary capacitor 237 is isolated from the transmitter 200 so all the circuit elements of the transmitting 200 and receiving 201 circuits match), the tank circuit 261 quickly goes into an oscillating pattern that is in synchrony with that of the transmitter's tank circuit 231. When the auxiliary capacitor 237 is switched on by closing the optoisolator 235, the transmitter circuit 200 oscillates in a pattern that is no longer matched to that of the receiver and the receiver 201 can no longer track the signal perfectly. That is, the transmitting circuit 200 and the receiving circuit 201 no longer synchronize. Note, the value of the combined capacitance $C_2$ can be varied over the range $1 \mu F$ to $0.015 \mu F$, a dynamic range of 66:1.

As discussed above, in the current embodiment, the receiving circuit 201 and the base configuration of the transmitting circuit 200 may be precisely matched, in terms of their oscillating behavior, to insure the receiver 201 will alternately synchronize and go out of synchronization responsively to the transmitter 200. That is, according to this embodiment, the transmitter's and the receiver's behaviors must be substantially matched for the transmitting and receiving circuits 200 and 201 to form an effective communications device. Since $\beta$ (See FIG. 1D) varies as the square of resistance, precise resistors should be used in the transmitter 200 and the receiver 201. A combination of a 1580 ohm fixed resistor 280 and a 200 ohm, 25-turn pot 265 may be used for resistors 280 and 265 in the receiver 201. This allows tuning of the receiver resistors to obtain a precise match to those in the transmitter. Note, if component values of the receiving circuit are chosen to match the values of $\alpha$ and $\beta$ the transmitting circuit but depart more substantially from those of the receiving circuit, the receiving circuit may still be drivable into synchronization, but the response will not be as strong.

Note that the receiver circuit with the synchronizing resistor added may be configured with components that permit the receiver to produce a detectable pattern at the detector output of a chaotic signal produced by a Chua receiver whose component values do not match the transmitting circuit's precisely. A fully functional communication system can be made since the receiver can produce consistent output beat frequencies from the detector while the receiver circuit tries to follow the input signal. The receiver therefore detects signals that are not synchronized with the receiver chaotic parameters through a received process that shifts the amplitude and phase of the incoming strange attractor. This mode of operation produces a response over a wide range of $\alpha/\beta$ values as well as frequency ranges for a single specified $\alpha/\beta$ combination. One can build a vocabulary using this technique even when the chaotic signal attractor frequency is varied and $\alpha/\beta$ are different. The synchronizing resistor produces this beat frequency effect at the output of the detector.

A comparator 270 detects the alternating pattern of synchronizations and desynchronizations of the receiving circuit 201. The received signal at 286 is compared by comparator 270 with the voltage generated at 287. These two voltages are at corresponding locations 284 and 287 in the transmitting 200 and receiving 201 circuits. When the transmitting 200 and receiving 201 circuits are in synchrony, that is the when voltages follow the same time-dependent trajectory pattern, the comparator output 290 is zero. When the transmitting 200 and receiving 201 circuits are not in synchrony, that is when these voltages do not follow the same time-dependent trajectory pattern, the comparator output 290 is non-zero. A waveform is generated characterized by pulses representing the points where the two waveforms diverge by some voltage difference determined by the comparators 270 sensitivity. The sensitivity (voltage difference trigger) can be set by replacing the fixed comparator 270 with a comparator with hysterisis. Of course there may be a DC component, but that is ignored or filtered out of the comparator output 290.

The following is what occurs in the transmitter as the transmitting circuit 200 is modulated. When the auxiliary capacitor 237 is switched out of the circuit during a first time interval, the transmitting circuit oscillates around the base (strange) attractor at a particular attractor frequency. The circuit, of course oscillates not at a specific frequency, but about a set of attractors. That is, the modulated signal is chaotically "smeared" over a range of frequencies around the current strange attractor equilibrium point or points. In the embodiment of FIGS. 2a and 2b, the equilibrium point(s) correspond to the base value of $C_2$, which corresponds to the capacitance of capacitor 220 alone. Note that for some of the operating regimes illustrated in FIG. 1D, the equilibrium point(s) may be depend on the initial state also. When the auxiliary capacitor 237 is switched on, by the opto-isolator 235, the transmitting circuit 200 begins oscillating in a different pattern corresponding to a then-current initial state and the new value of $C_2$ equal to the capacitance of capacitor 220 and auxiliary capacitor 237.

When a modulation pattern of successive actuations/deactuations is applied through the opto-isolator 235, the transmitting circuit 200 switches between the first (base) signal and the second signal in accordance with the modulation pattern. In the receiver 201, the transmitted $V_1(t)$ signal is applied at 281 and through resistor 280. The receiver's L-C tank circuit 261 sees the received $V_1(t)$ applied through a resistor 280 so that when the base-signal is transmitted, the $V_1(t)$ signal applied at 286 causes the voltage at 281, $V_2'(t)$, to follow the same time-dependent trajectory as $V_2(t)$ of the transmitting circuit 200. Given that $V_2'(t)$ in the receiving circuit is substantially identical to $V_2(t)$, the $V_1'(t)$ in the receiving circuit follows the same time-dependent trajectory as $V_1(t)$ of the transmitting circuit 200. Thus, the two circuits are synchronized when the transmitting circuit is oscillating about the base strange attractor(s). When $V_1(t)$ received corresponds to the base signal, $V_1(t)$ and $V_1'(t)$ are substantially identical and an output 290 of a comparator 270, to whose inputs $V_1(t)$ and $V_1'(t)$ are respectively applied, has a nominally zero amplitude. In a practical system, the output of the comparator may have some hysteresis so that the difference must exceed some nominal level to generate a nonzero output.

When the optoisolator 235 switches in the auxiliary capacitor 237, transmitting circuit 200 oscillates about the second strange attractor(s). When that happens, the receiving circuit 201 can no longer synchronize in response to the $V_1(t)$ applied at 281. This is because $C_2'$ (the capacitance of capacitor 260) no longer matches $C_2$ (the combined capacitance of capacitor 230 and auxiliary capacitor 237). As a result, the pattern of oscillation of $V_1'(t)$ is no longer synchronized with $V_1(t)$ transmitted and the output 290 of comparator 270 is no longer zero. The changes in output 290 between the nominal zero and nominal oscillating states may be registered through some convenient system, such as a power meter or frequency counter on the output 290, to generate a signal carrying the data in the information signal 236.

The receiving circuit 201 is very sensitive to the chaotic signal of $V_1(t)$. That is, the incoming signal can be a very low peak power signal (power within a narrow frequency band about a peak) while still cause the receiving circuit to synchronize with the transmitting circuit. That is, the receiving circuit 201 is able to follow the distinct chaotic time-dependent pattern of the received signal (when the base signal is being transmitted) and only by virtue of its inherent tendency to follow (be driven by) it, is the receiver 201 able to pick up the signal out of the noise. It is very much a resonance phenomenon, even though it is not periodic in the sense of strict linear oscillatory phenomena. This kind of resonance effect allows the power to be so spread over a range of frequencies that the transmitted signal appears to be "buried" in the noise of the channel. The only way to actually detect that signal is by means of a receiving circuit whose parameters are closely matched with the transmitting circuit. The values of the components of the transmitting circuit must be known in order to pick up the data signal masked in the chaotic signal applied to the channel. The sensitivity of the various embodiments described below is so great that an effective communications signal can be characterized by a zero dB signal-to-noise ratio.

Note that a higher signal-to-noise ratio will allow synchronization to be achieved with less precise component matching. To achieve reliable transmission with the lowest signal-to-noise ratio, the precision of component-value-matching should be as high as practical. To achieve precise resistance matching, as mentioned, fixed resistors may be used with 25-turn fine-tuning resistors, either in parallel or series for each resistor 280 and 265.

Figure 3A:
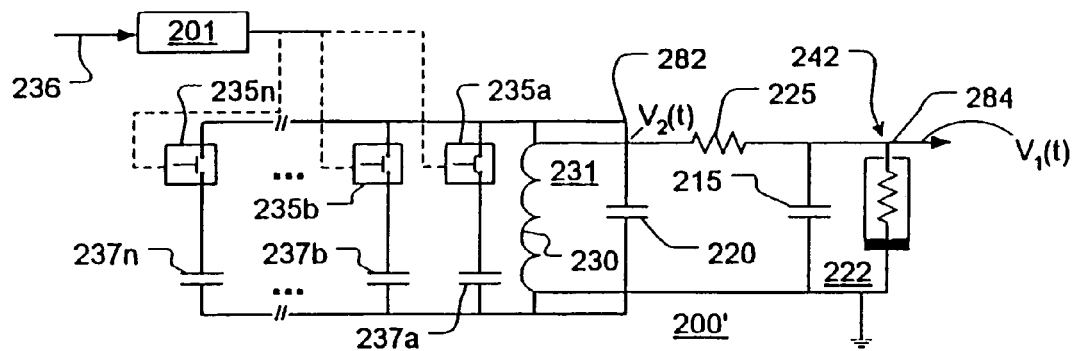
FIG. 3a is a transmitter according to another embodiment of the invention which produces a vocabulary of chaotic signals.
Figure 3B:
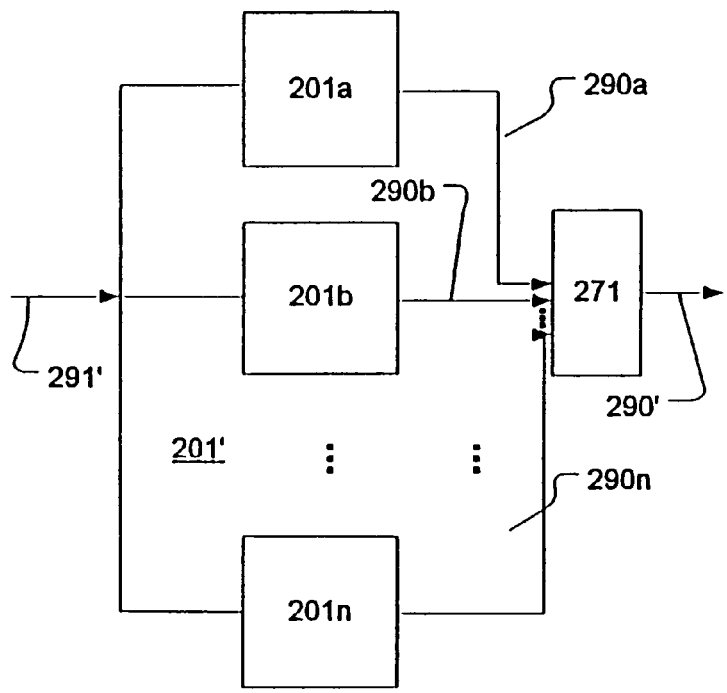

As discussed above, a large number of different operating regimes are available by modifying $C_2$. However, the receiver 201 may not be capable of distinguishing these because of the inability of the receiving Chua circuit to track a received signal 291 other than the one generated by the base configuration of the transmitting circuit. Referring to FIGS. 3a and 3b, a transmitter 200' has a bank of auxiliary capacitors 237a–237n that can be selectively switched into the tank circuit portion of the transmitter 200' by respective opto-isolators 235a–235n.

Opto-isolators 235a–235n are controlled by a controller 201 responsively to the input signal 236. In all other respects, transmitter 200' is identical to transmitter 200 of FIG. 2a.

To produce a modulated signal, controller 201 is programmed to receive a data word at 236 and control opto-isolators 235a–235n to switch one or more of them into the circuit to produce a particular chaotic pattern. For example, if opto-isolators 235a and 235b are actuated to switch in auxiliary capacitors 237a and 237b, the capacitances of capacitors 220, 237a, and 237b are combined to produce a corresponding chaotic signal. This unique pattern forms one word or symbol of a vocabulary of possible ones that may be generated by actuating opto-isolators according to the various possible combinations. In the receiver 201', a bank of receivers 201a–201n, each the same as shown in FIG. 3b, but with different component values chosen to allow each to resonate with a corresponding configuration of the transmitter 200'. That is, the component values for each receiver 201a–201n, are chosen such that each will synchronize with one word of the vocabulary of chaotic signals generated by the transmitter 200'. The outputs of each receiver 201a–201n each correspond to the output 290 of the comparator of FIG. 2b. These are individually applied to a detector 271 that determines which of the outputs 290a–290n is in synchrony with the transmitter 200' at a given point in time. Detector 271 determines this by indicating which output 290a–290n is nominally equal to zero. Output 290' may be a stream of digital words each corresponding to the word transmitted. Thus, at any given instant, signal 290' may indicate the current, or most recently received, word being applied in the received signal to input 291'. The number of bits that may be transmitted with each cycle of the opto-isolators 235a–235n is equal to the $\log_2$ (log base-2) of the number of different capacitor values $C_2$ forming the vocabulary. In this embodiment, the number of receivers 201a–201n matches the size of the vocabulary, that is, the number of symbols or words generated by the transmitter 200'.

Figure 4A:
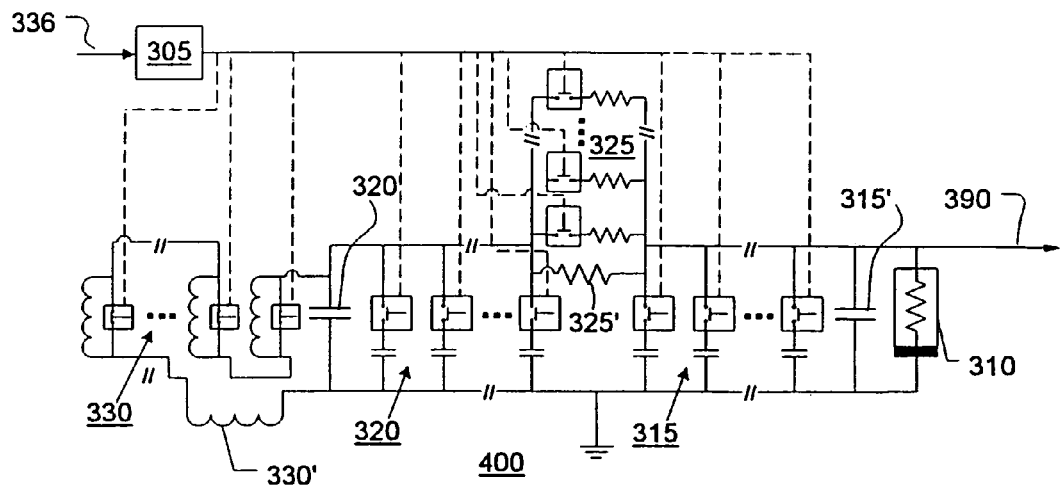
FIG. 4a is a transmitter according to another embodiment of the invention which produces a vocabulary of chaotic signals in which all such signals are mappable to the same combinations of the lump parameter plane of FIG. 1D.
Figure 4B:
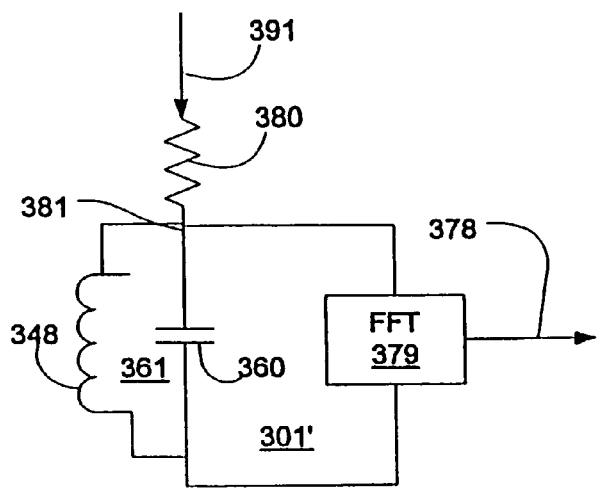
FIG. 4b is another receiver for use with the embodiments of FIG. 3a and FIG. 4a, this receiver being usable with a simple counter circuit for determining a beat frequency.

Referring to FIGS. 4a and 4b, an alternative embodiment of the invention also produces a vocabulary of signal-words. In this embodiment, the values of the various components are chosen so that all "words" of the vocabulary are produced by configurations that maintain the same α-β combinations. That is, the values of $C_1$, $C_2$, R, and L of the transmitting circuit 300 are varied to produce a variety of selectable chaotic oscillation patterns, each of which coincides with the same α/β combinations. A bank of inductors 330 may be provided that can be switched in by respective opto-isolators to add to the inductance of the fixed inductor 330'. To this end, a bank of capacitors 320 may be provided that can be switched in by respective opto-isolators to add to the capacitance of the fixed capacitor 320'. A bank of capacitors 315 may be provided that can be switched in by respective opto-isolators to add to the capacitance of the fixed capacitor 315'. Finally, a bank of resistors 325 may be provided that can be switched in by respective opto-isolators to change the resistance of fixed resistor 325'.

In the embodiment of FIGS. 4a and 4b, instead of modulating the behavior of the transmitting circuit by varying only one component, the values of combinations of components determining $C_1$, $C_2$, R, and L are varied in such a way as to maintain $\alpha = C_2/C_1$ and $\beta = R^2 C_2/L$ constant under the control of a controller 305. That is, values of the auxiliary capacitors, resistors, and inductors in banks 315, 320, 325, and 330 are chosen so that when predefined combinations of the corresponding opto-isolators are actuated, the oscillating frequency changes (See equation (1), below), but α and β remain the same.

In a first embodiment, the inductance L and the capacitances $C_1$ and $C_2$, only, are varied, maintaining R constant. That is, only the opto-isolators in banks 315, 320, and 330 are switched to modulate the circuit. The fundamental frequency of the tank circuit, given by $$F = 2\pi L C_2^{-1/2} \qquad (1)$$

varies even though the oscillating regime remains constant. In this embodiment, there is no need to vary R to maintain a constant α and β. Also, the non-linear resistor 310 components do not have to be varied. In the preferred embodiment of the transmitter 300, one combination of values of $C_1$, $C_2$, and L (corresponding to one state of the opto-isolator switches) may be identical to the combination of values corresponding to a receiving circuit 301. This combination of values causes the transmitting circuit to oscillate at a base frequency corresponding to the frequency of the receiver. In a first alternative embodiment, the values of $C_1$, $C_2$, and L are varied, keeping R constant.

The receiver 301, shown in FIG. 4b, consists of a tank circuit 361 and a fast Fourier transform FFT computer 379. The tank circuit's 361 component values are chosen to match the α/β combinations of the transmitter 300. The value of resistor 380, in the first embodiment, may be chosen to match that of the fixed R value of the transmitter. (As mentioned above, R is fixed in the first embodiment. The embodiment depicted in FIG. 4a is capable of variable R values, but a single fixed value is used in the first embodiment. If a fixed R value is to be used, the bank of resistors 325 could be omitted leaving only a single resistor 325'.) The output 390 of the transmitter 300 is applied (through some transmission medium) to an input 391 of the receiver. The FFT block 379 determines the word transmitted by the transmitter detecting the difference between the fundamental frequency, given by equation (1), of the instant configuration of the transmitter 300, and the fixed configuration of the tank circuit 361. The FFT block 379 "sees" this frequency difference because the tank circuit 361 attempts to follow the trajectory of the incoming signal applied through resistance 380. Since, however, the incoming signal is at a different frequency, the tank circuit 361 is not able to maintain this trajectory and it "falls off the rails." The frequency with which the tank circuit alternately follows and uncouples from the incoming signal applied at 391 is equal to the difference between the fundamental attractor frequency of the transmitter 300 and that of the tank circuit 361. A peak at this difference frequency is indicated by the output 378 of the FFT block. Thus, output 378 indicates each word generated by the transmitter 300.

In an alternative embodiment, the value of R (the resistance determined by the configuration of resistor bank 325) of the transmitter 300 is varied also. In this case, the value of resistor 380 of the receiver 301 may be any of the values used for R in the transmitter 300 or another value.

In the receiving circuit 201 of FIGS. 2a and 2b, the Chua circuit oscillates in synchrony with that of the transmitter 200 when the base signal is received. The resulting output 290 from the comparator 270, as discussed, is a flat (nominally zero) output. However, when the transmitter 200 is placed in a configuration such that it a signal other than the base signal, the comparator output 290 of the receiver 201 becomes substantially non-zero and, also, chaotic due to the lack of synchronization. This would also be the case if the transmitter 300 were connected to the receiver 201 of the prior embodiment. Any signal other than ones that drive the receiver into synchronization will produce a non-zero chaotic signal at the output 290. In other words, if this output 290 were viewed on an oscilloscope, the trace would appear chaotic and it would be difficult if not impossible to tell which "word" of the vocabulary of strange attractors was generating the transmitted signal. This is because $V_1'$ can no longer synchronize with the $V_1$ transmitted.

In the combination of the transmitter 300 and the receiver 301 of the FIG. 4a/4b embodiment, however, the transmitter drives the tank circuit 361 for part of the tank circuit's fundamental cycle but subsequently skips ahead or lags behind (unless, of course, the fundamental frequency of the transmitter is the same as that of the receiver) the driving input voltage applied at 391. This happens at the frequency difference (a beat frequency; the difference between the fundamental frequency of the transmitter (eq. (1)) and the fundamental frequency of the receiver) and thus forms a detector. The reason the receiver is able to follow the transmitter in this way is that the α and β of the transmitter and receiver are matched and the natural frequency of the tank circuit is an integer multiple of the frequency of the transmitting circuit given by equation (1).

In addition to using a FFT calculator, alternative ways of detecting the beat frequency include an amplitude detector connected across the same terminals as the FFT calculator and which outputs to a counter. The counter may count the number of beats to determine the frequency of the transmitter. Various other alternatives would occur to a practitioner skilled in the art of signal conditioning.

Figure 4C:
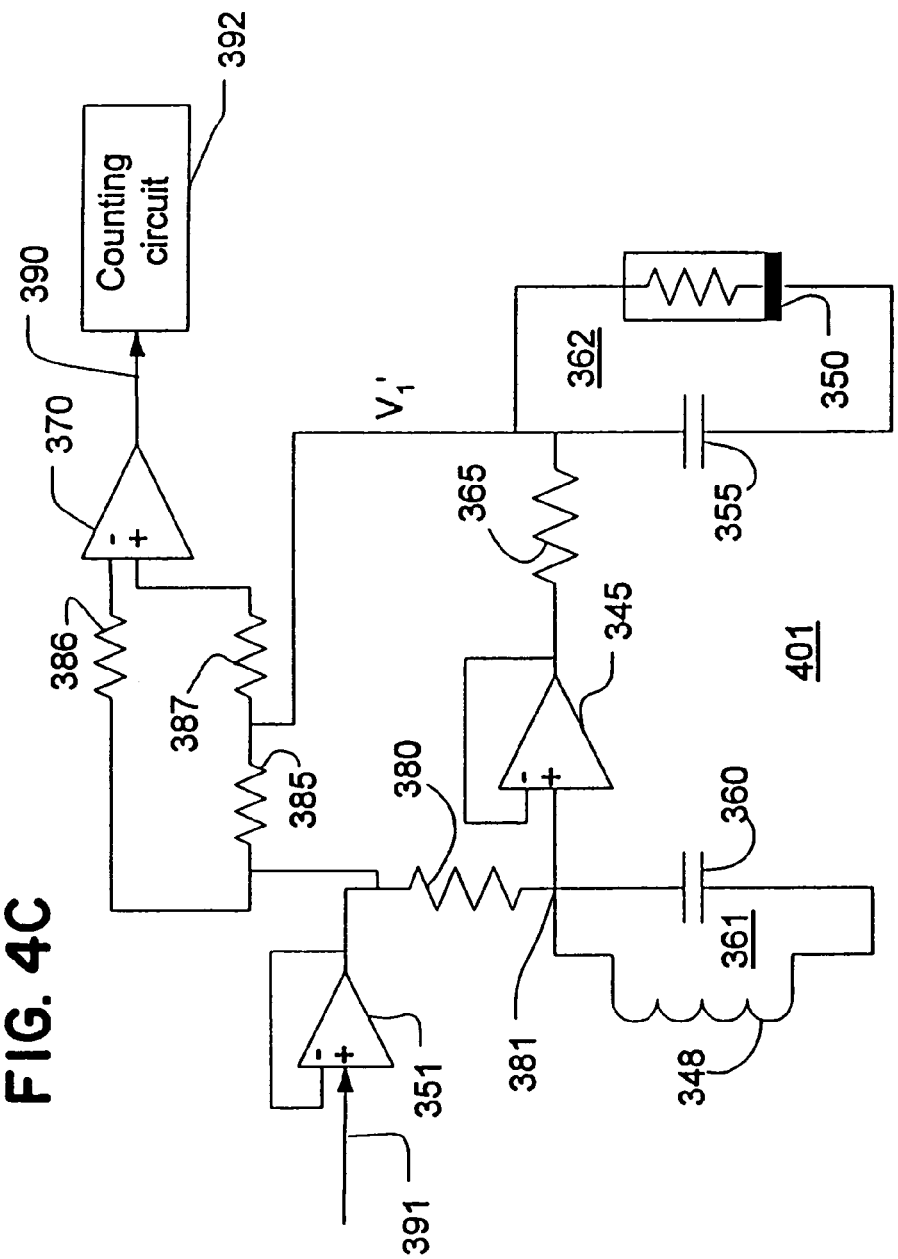
FIG. 4c is another receiver for use with the embodiment of FIG. 3a and FIG. 4a using synchronizing resistor 385.

Referring now to FIGS. 4a and 4c, an alternative receiver design 401 employs a synchronizing resistor 385 and comparator input resistors 386 and 387. In this embodiment, the received signal, corresponding to a signal other than the base strange attractor, is applied to the chaotic portion 362 through the synchronizing resistor 385. In the embodiment of FIG. 4c, it has been found, through experiment, that the synchronizing resistor 385 may be adjusted to optimize the ability of the receiver circuit 401 to follow the trajectory of the transmitter signal at portions thereof so that the zero levels of the output 390 are clean and clear. The application of the received signal to the chaotic portion 362 of the receiver 401 through synchronizing resistor 385 forces the chaotic portion into an oscillation pattern that forms clear and distinct beats with the original transmitted signals that are output by the comparator 370. Because the beats (amplitude differences) are distinct and clear, a counting circuit 392 can be used to indicate the detected word. As in the embodiment of FIG. 4b, the beats indicate the frequency of the transmitting circuit 300 oscillations. It appears the reason the synchronizing resistor 385 allows clean beats to be formed is that the receiver is forced by the application of $V_1(t)$ to the chaotic portion to follow certain portions (i.e., zero crossings) of the chaotic signal from the transmitter 300. During these brief intervals, the comparator output 390 goes to nominal zero output.

Counting circuit 392 may be any of various circuits for determining the number of such zero-intervals per unit time. For example, the counting circuit may reset a timer at the start of a nominal zero (zero within a tolerance) and output a pulse to a counter if the zero is maintained for some threshold interval. The counter may be reset through the transmission of a base chaotic signal for which the comparator output remains zero for a second threshold interval. The counter may automatically reset at predetermined intervals maintained in synchrony by the transmission of the base chaotic signal.

Note that the use of a photo field-effect transistor (FET) optocoupler for the opto-isolator used in the various transmitter embodiments is recommended because of the following properties. First, the example used for evaluating the circuits tested has a gallium-arsenide infrared emitting diode coupled to a symmetrical bilateral silicon photodetector. The detector is electrically isolated from the input signal and performs as an ideal FET. Distortion free control of low level alternating current (AC) and direct current (DC) signal is enabled. The primary features that relate to modulating chaos is the low output impedance of the FET when active (i.e., $\leq 100$ ohms). Also, the device exhibits high impedance ($\geq 300$ Mega-ohms) when switched off. The output FET is controlled via a channel voltage that does not require external biasing of the device so that it can operate as an ideal switch. This is compared to conventional FETs that require external biasing. In addition, the device is characterized by a shunt capacitance of $\leq 15$ picofarads. The circuits allow switching speeds of up to 2 Megahertz. For slower speeds, a solid state relay switch may be used. Finally, a normal FET has some capacitance between the drain and the gate. The small current differential permitted by this can prevent the circuit from operating chaotically or it can make it difficult to match the chaotic pattern of the base signal in the receiving and transmitting circuits.

Figure 4D:
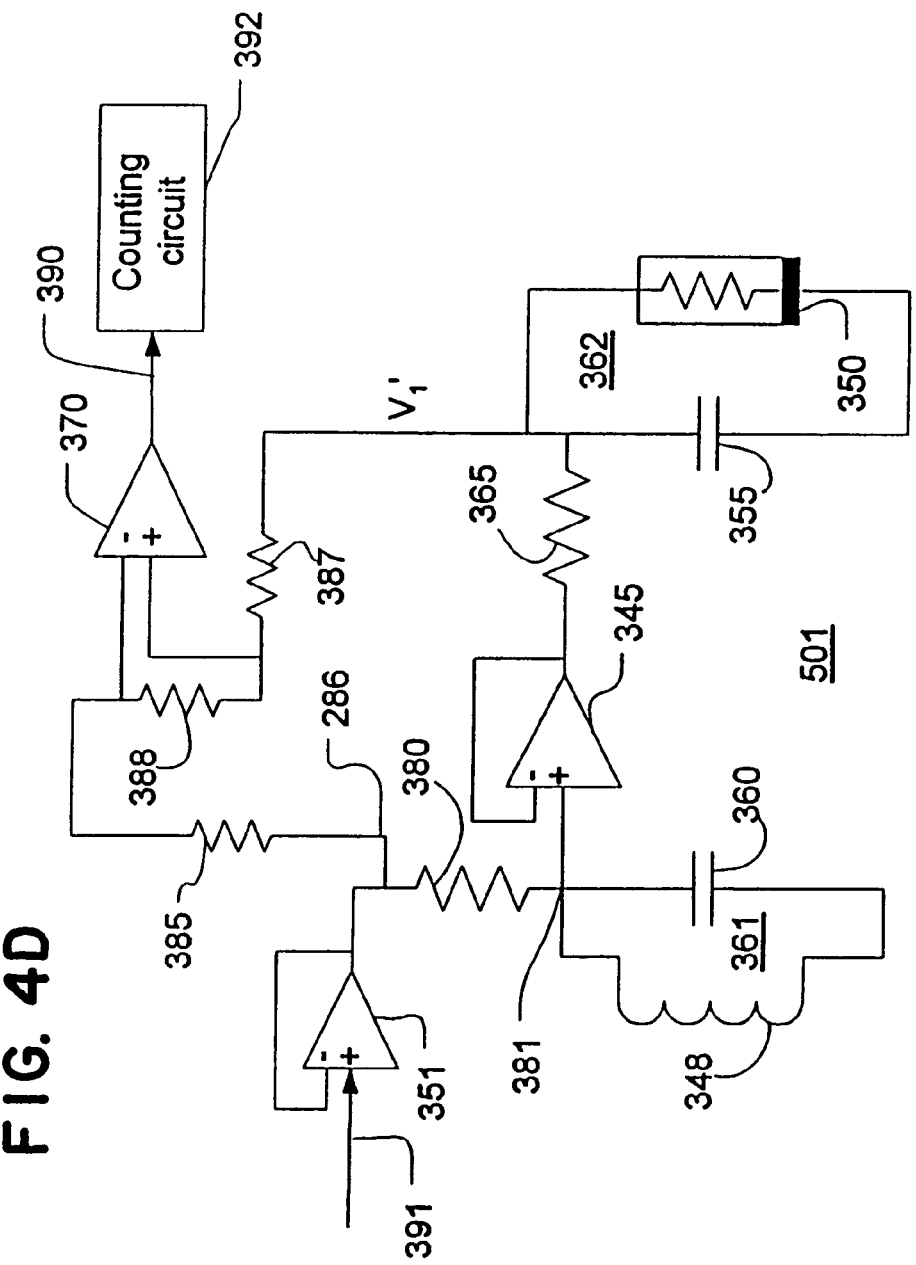
FIG. 4d is another receiver usable with a simple counter circuit for determining a beat frequency using synchronizing resistor formed from a combination of resistors.

The embodiment of FIG. 4d, receiver 501, has the characteristics of that of FIG. 4c except the synchronizing resistor is formed of the sum of resistors 385, 387, and 388. As in the embodiment of FIG. 4c, the embodiment of FIG. 4d also uses a simple counter circuit for determining a beat frequency. Also, the combination of resistors 385, 387, and 388 provide a synchronizing element to lock the chaotic portion of the receiver to the incoming signal, as in the embodiment of FIG. 4c. However in this embodiment a voltage follower 351 isolates the incoming communication signal from the receiver-generated chaotic signal.

It has been determined that a resonance voltage difference is achieved when the resistance of the synchronizing resistor is approximately 5 times the resistance of resistor 380. This configuration maximizes the voltage difference between points 286 and 287 of FIG. 4d and FIG. 2b, respectively.

Figure 4E:
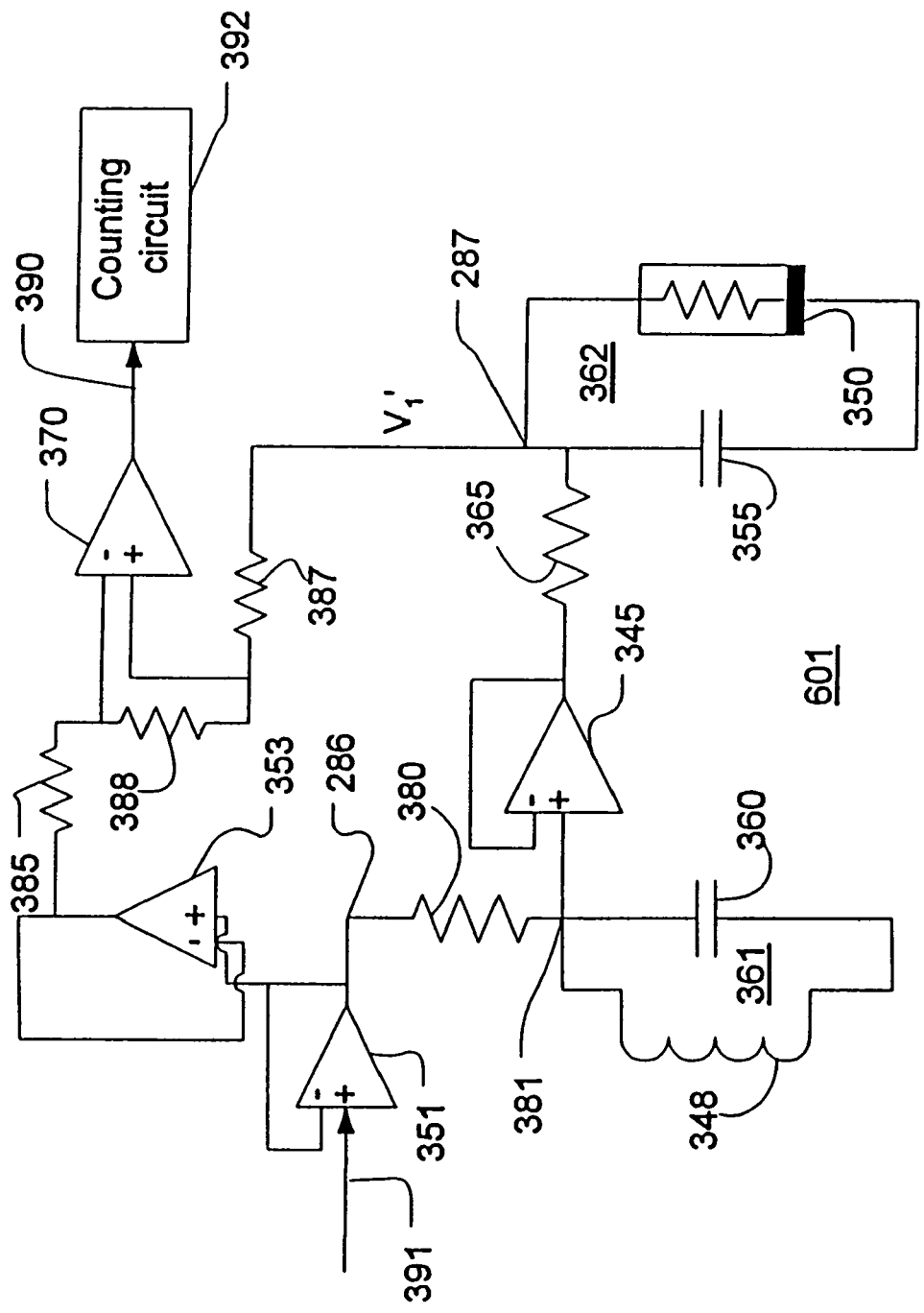
FIG. 4e is another receiver similar to that of FIG. 4d, but which adds an emitter follower 351 to isolate the oscillator portion 361 from point 287.

The embodiment of FIG. 4e, receiver 601, adds an emitter follower 353 to isolate the oscillator portion 361 from point 287. In other words, a voltage follower blocks feedback from point 287 to the oscillator portion. It provides feed-forward coupling of the incoming signal 391. This causes synchronization to be forced through two parallel paths. One path is through the emitter follower 351 and synchronization resistors 385, 388, and 387 to the chaotic portion of the Chua circuit. The other path is through the oscillator portion 361 and the emitter follower 345 and resistor 365.

Figure 4F:
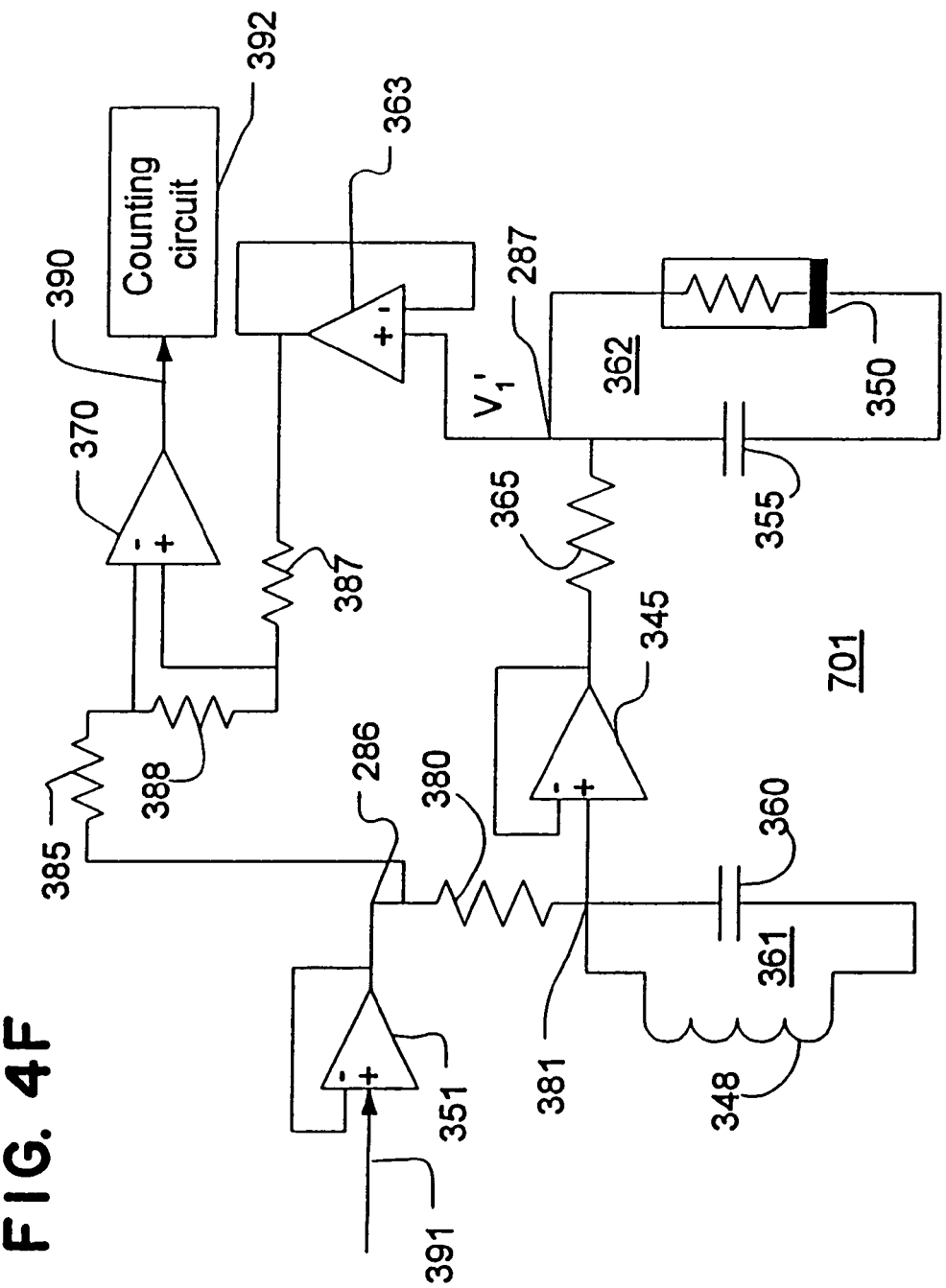
FIG. 4f is a receiver usable with a simple counter circuit for determining a beat frequency, the resistors providing a synchronizing element to lock the incoming voltage of the communications channel and the receiver generated voltage. However in this embodiment, a voltage follower 363 isolates the receiver generated signal from the incoming signal and allows the receiver generated signal to feedback into the oscillator portion of the Chua circuit to cause faster synchronization.

The FIG. 4f embodiment, receiver 701, reverses the feedback path using an emitter follower 363 to provide a phase lock loop type operation in which the voltage $V_1'$ is fedback into the oscillator portion of the Chua circuit to achieve synchronization.

Referring now to FIG. 5, a general chaotic communications system in which the synchronization concept identified above is applied includes a transmitter 780 and a receiver 790. Transmitter 780 includes a first subsystem 700 signally coupled to a second subsystem 705. Subsystems 700 and 705 may include common elements, but are not coextensive. First subsystem 700 applies a signal $S_1$ to second subsystem 705 and second subsystem 705 applies a signal S2 to first subsystem 700. First subsystem 700 drives second subsystem 705 with signal $S_1$ and second subsystem 705 drives first subsystem 700 with signal S2. Either first subsystem 700 or second subsystem 705 may be driven by a driving signal or by some current source 715 or simply by establishing an initial state if both systems are lossless as in a purely numerical system generated by a computer. Current source 715 could form a portion of either subsystem 700 and 705 as in a Chua diode described in detail in various prior art publications, for example, *Chua's Circuit: A Paradigm for Chaos*, Ed. Rabinder N Madan, (see pp. 13–24), World Scientific Publishing, NJ, USA, 1993; the entirety of which book is incorporated herein by reference. Alternatively, in a physical system such as an electrical circuit, the current source 715 could be derived from a driving circuit such as described in U.S. Pat. No. 5,473,694 (element 115 in FIGS. 1 and 7) the entirety of which patent is incorporated herein by reference. Again in a numerical model, current source 715 would be absent since the transmitter 780 could be considered lossless.

The transmitter is perturbed by some means to modulate the signal $S_2$ to convey information. This may be done by injecting current into either signal S1 or S2 or some portion of either or both of the first and second subsystems 700 and 705 or by modifying parameters of either or both of the first and second subsystems. This information signal injection process is represented by the application of information signal $S_i$ to either of the first and second subsystems 700 and 705. Note, however, that the information signal may be coextensive with a driving current source 715 such as described in U.S. Pat. No. 5,473,694 and that it may be applied as a current addition to either or both of signals $S_1$ or $S_2$ or by application to either of subsystems 700 or 705.

In accordance with the invention, signal $S_2$ is applied to the receiver 790. In the prior art arrangements, the signal $S_2$ would be applied only to a third subsystem 730 whose configuration closely matches first subsystem 700. According to the teachings of the invention, however, the transmitted signal $S_2$ is also applied through a synchronizing filter 750 to the fourth subsystem 735 whose characteristics closely match those of second subsystem 705. To extract the received signal, the incoming signal $S_2$ is processed together with the signal $S_4$ generated in the response, for example by subtracting them in a comparator with hysteresis 740. Alternative methods of processing the received signal and the signal S4 generated by the receiver may be employed, for example, the phase comparison technique described in U.S. Pat. No. 5,473,694.

Note that in all of the above embodiments, it may be desirable periodically to send a registration signal, for example, a contiguous series of base chaotic signals, to insure that any clocking on the receiving and transmitting ends are aligned. Such registration may be needed, for example, to demarcate the time blocks applied to the FFT calculator so that the correct time series is sampled. This may not be necessary, depending on the size of the FFT block relative to the symbol duration.

Note that the invention may be implemented using a computer rather than discrete components since the Chua circuit is readily susceptible to digital simulation. In this case, all the above-described processes would be carried out digitally, with appropriate use of A/D and D/A conversion at either end of the communications channel. The communications systems described also form the basis of computer algorithms that can be implemented in a processing architecture to implement a chaotic communications system.

What is claimed is:

1. A communications receiver, comprising:
   a chaotic oscillator having an oscillator portion and a chaotic portion with a non-linear resistance element such that when said oscillator and chaotic portions are coupled, they form said chaotic oscillator;

a synchronizing resistor that couples said oscillator portion and said chaotic portion to pass a current signal therebetween;

said oscillator portion being signally coupled to a communications medium carrying a modulated chaotic signal;

said chaotic portion being signally coupled directly to said communications medium such that a voltage of said communications medium is directly applied to said chaotic portion through a circuit path parallel to a coupling allowing said current signal to pass between said oscillator portion and said chaotic portion;

a comparator having a first input coupled to said communications channel and a second input coupled to said chaotic portion, wherein the synchronizing resistor is adjusted so that an output of said comparator is clean and clear, and wherein the output of said comparator indicates, by nominal zero levels, a difference between a frequency characterizing said modulated chaotic signal and a frequency of said chaotic portion; and said chaotic portion being coupled to said communications medium through a resistor bridging said first and second inputs of said comparator.

2. A device as in claim 1, wherein said chaotic portion includes a capacitor coupled to said non-linear resistance element.

3. A device as in claim 1, wherein said oscillator portion includes a tank circuit.

4. A device as in claim 1, further comprising a beat detector coupled to said comparator output.

5. A device as in claim 1, further comprising a counting circuit connected to said comparator output.

6. A communications device, comprising:

a chaotic oscillator connectable to a communications channel;

said chaotic oscillator having a tank circuit with at least two capacitors and an inductor and having an effective capacitance determined by said at least two capacitors;

a first of said at least two capacitors being connected to said inductor and a second of said at least two capacitors being selectively connectable to said inductor to combine respective capacitances of said at least two capacitors through a switch, wherein said second of said at least two capacitors is isolated from said chaotic oscillator by said switch;

said switch having an input for accepting an information signal and being controllable responsibly to said information signal without transforming said information signal, wherein said effective capacitance does not include said second of said at least two capacitors when said switch is switched to a first state, wherein said effective capacitance includes said second of said at least two capacitors when said switch is switched to a second state, wherein said chaotic oscillator is selectively alternated between at least two oscillating regimes and thereby modulated in accord with said information signal to generate a chaotic signal which at each instant oscillates according to a selected one of said oscillating regimes, and wherein a first oscillating regime being associated with said first state of said switch and a second oscillating regime being associated with said second state of said switch;

a receiver signally coupled to said communications channel; and said receiver having a receiving chaotic oscillator portion for each of said at least two oscillating regimes, each portion being configured to synchronize with a respective one of said at least two oscillating regimes.

7. A device as in claim 6, further comprising a detector connected to detect which of said at least two oscillating regimes is currently synchronized and to generate an output indicating the same such that said information signal is recovered from said chaotic signals.

8. A chaotic communications system, comprising:

a transmitter;

a receiver;

said transmitter having first and second subsystems, said first subsystem being connected to apply a first signal generated in said first subsystem to said second subsystem;

said receiver having third and fourth subsystems, said third subsystem being connected to apply a third signal generated in said third subsystem to said fourth subsystem;

said second subsystem being connected to apply a second signal generated in said second subsystem to said first subsystem;

one of said first subsystem and said second subsystem being drivable by one of an external driving signal, an external current source, and a pre-established initial state where said first and second subsystems are lossless where said first and second subsystems are generated numerically by a computer;

said first and second subsystems being configured such that a chaotic oscillation is maintained therebetween, whereby said first and second signals are chaotic, said transmitter further including a modulator responsive to an external information signal connected such that said chaotic oscillation is perturbed and a modulated signal derived thereby or a signal derived from said chaotic oscillation unperturbed is augmented such that said signal is modulated;

said transmitted second signal being connectable through a communication channel connectable to said third subsystem, whereby a received version of said second signal is applied to said third subsystem;

said receiver also having a synchronizing filter for applying a filtered version of said received second signal to said fourth subsystem;

said receiver having a decoder connected to derive a received information signal from said received second signal by comparing said received second signal, without transforming said received second signal, to a signal inhering in said receiver.

* * * * *

UNITED STATES PATENT AND TRADEMARK OFFICE
CERTIFICATE OF CORRECTION

PATENT NO. : 6,980,657 B1  Page 1 of 1
APPLICATION NO. : 09/532025
DATED : December 27, 2005
INVENTOR(S) : Daniel E. Hinton, Sr. et al.

It is certified that error appears in the above-identified patent and that said Letters Patent is hereby corrected as shown below:

On the cover page, References Cited section (56), Other Publications:
    insert the following references:
--PINKEY et al.: "Chaos shift keying communications system using self-synchronising Chua oscillators", Electronic Letters, vol. 31, no. 13, 6/22/95, pages 1021-1022. KOH and USHIO: "Digital communication method based on M-synchronized chaotic systems" IEEE Transactions on Circuits and Systems, vol. 44, no. 5, May 1997, pages 383-390.
CARROL and JOHNSON: "Synchronizing Autonomous Chaotic Circuits Using Bandpass Filtered Signals", IEEE, 1998, pages 558-561.--

Signed and Sealed this

Twenty-fifth Day of July, 2006

JON W. DUDAS
*Director of the United States Patent and Trademark Office*